Aug. 6, 1940.　　　R. S. TAYLOR　　　2,210,511
REFRIGERATION
Filed Oct. 19, 1938　　　2 Sheets-Sheet 1

INVENTOR.
Robert S. Taylor
D. E. Heath
BY　ATTORNEY.

Patented Aug. 6, 1940

2,210,511

UNITED STATES PATENT OFFICE 2,210,511

REFRIGERATION

Robert S. Taylor, Evansville, Ind., assignor to Servel, Inc., New York, N. Y., a corporation of Delaware Application October 19, 1938, Serial No. 235,755

9 Claims. (Cl. 62—5)

My invention relates to heat transfer by vaporization and condensation of fluid and it is an object of the invention to provide a system for transferring heat downward in which liquid is raised by pressure of vapor resulting from vaporization which is effective in the heat transfer.

Figure 1:
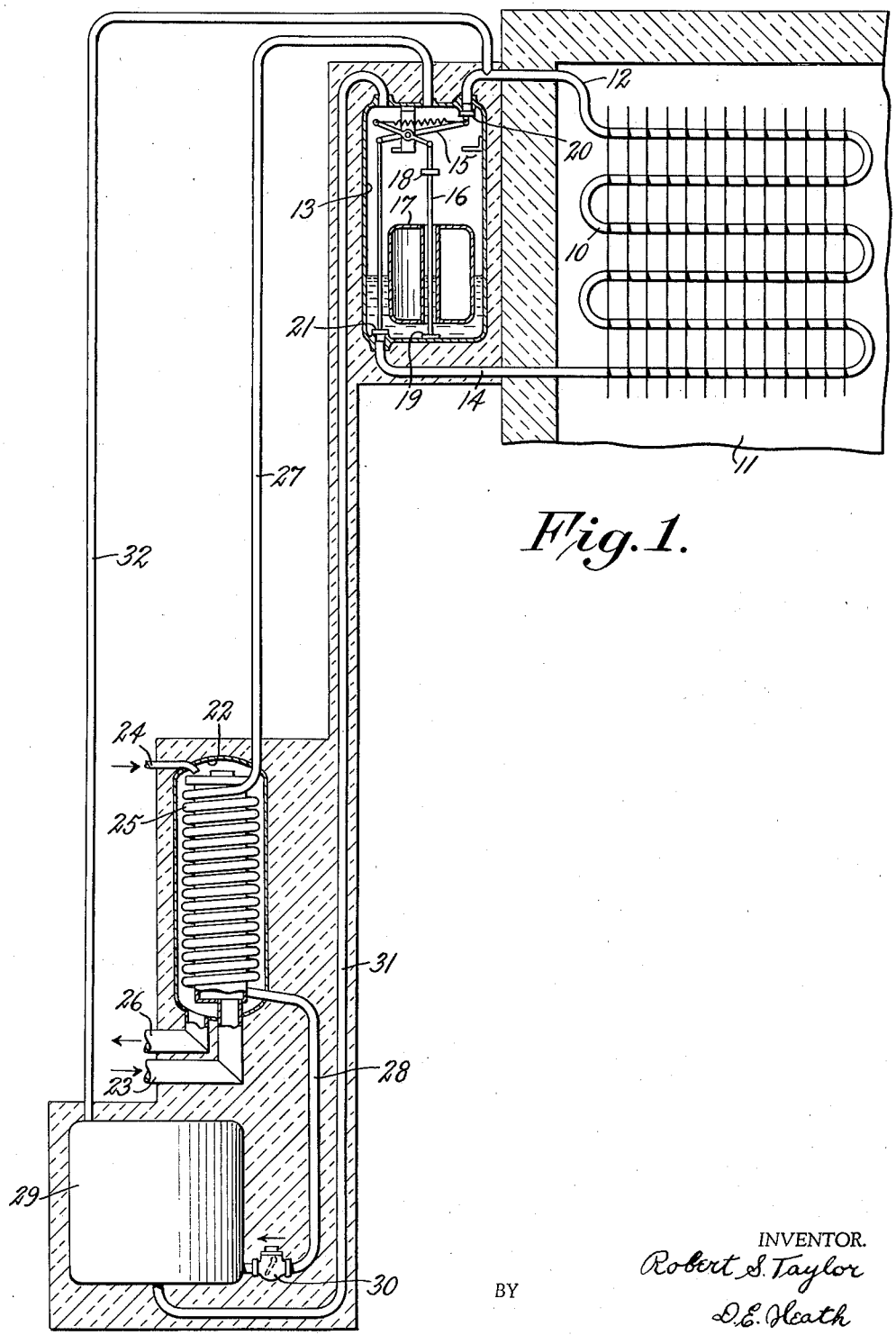
Figure 2:
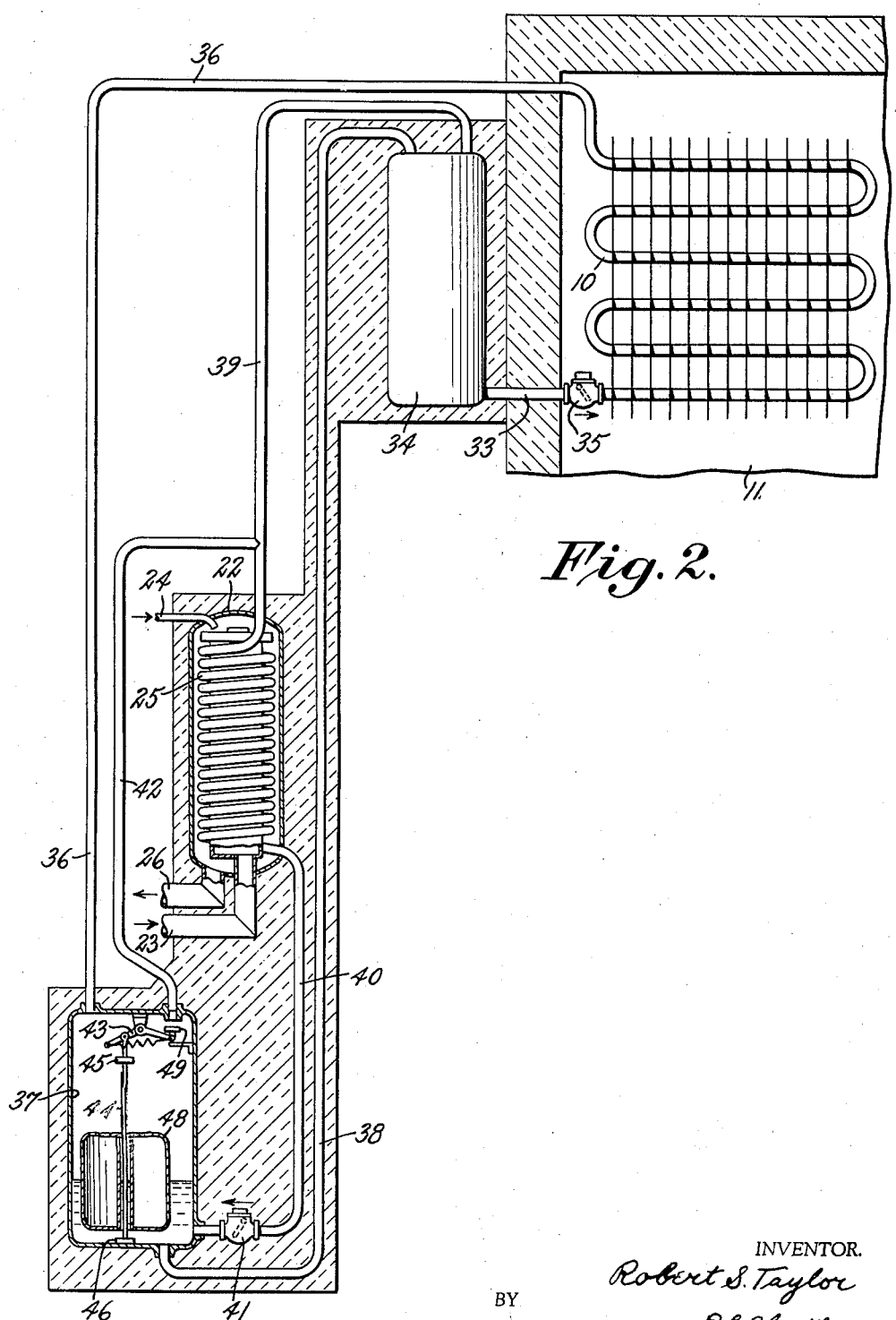

Fig. 1 shows more or less schematically a system embodying the invention and used for transferring heat from a place to be cooled at an upper level to a cooling element at a lower level; and Fig. 2 is a similar view illustrating a modification.

Referring to Fig. 1, an evaporator coil 10 is located in a thermally insulated refrigerator compartment 11. The upper end of evaporator 10 is connected by a conduit 12 to the upper part of a control vessel 13. The lower end of the evaporator coil 10 is connected by a conduit 14 to the lower part of control vessel 13.

In the control vessel 13 is a spring toggle 15 operated by a rod 16. An annular float 17 is loose and slideable on rod 16. Rod 16 is provided with stops 18 and 19 at spaced points respectively above and below float 17. A valve 20 controls communication of conduit 12 with vessel 13. A valve 21 controls communication of vessel 13 with conduit 14. Valves 20 and 21 are operated together by the toggle mechanism 15. Valves 20 and 21 open and close together so that evaporator 10 is respectively connected to and segregated from vessel 13.

At a lower level, for instance, the basement of a building in which the refrigerator compartment 11 is on the first floor, is refrigeration apparatus including a cooling element 22. Other parts of the refrigeration apparatus are not illustrated but may be as described in application Serial No. 107,852 of Albert R. Thomas. This apparatus is of a uniform pressure absorption type. Inert gas enters evaporator 22 through a conduit 23. Liquid refrigerant enters the evaporator 22 through a conduit 24. The liquid refrigerant flows downward over a pipe coil 25 and evaporates and diffuses into the inert gas producing a refrigerating effect for cooling coil 25. The resulting gas and vapor mixture leaves the evaporator through a conduit 26.

The upper end of evaporator coil 25 is connected by a conduit 27 to the upper part of control vessel 13. The lower end of coil 25 is connected by a conduit 28 to the lower part of a reservoir or circulation vessel 29. A check valve 30 in conduit 28 permits only downward flow of liquid in this conduit. The lower part of vessel 29 is connected by a conduit 31 to the upper part of control vessel 13. The upper part of vessel 29 is connected by a conduit 32 to conduit 12.

The lower coil 25 and the upper coil 10 together with their interconnecting vessels and conduits constitute a vaporization-condensation circuit containing a suitable volatile fluid which vaporizes in the upper coil 10 by heat transfer from the refrigerator compartment 11 and condenses in coil 25 by heat transfer to the refrigeration apparatus through evaporator 22. The present invention has to do with returning liquid from the lower coil 25 to the upper coil 10.

In starting at a time when all parts are at room temperature, any liquid will be contained in vessel 29 in the lowest part of the system. As the refrigeration apparatus lowers the temperature of coil 25, vapor condenses to liquid in this coil and the liquid runs downward through conduit 28. There being no liquid in control vessel 13, the float 17 will be down and the valves 20 and 21 closed. The coil 25 is connected by conduit 27 to the upper part of vessel 13 so that as vapor collapses in coil 25 the pressure in this coil and in vessel 13 decreases below the pressure in vessel 29. The check valve 30 prevents upward flow of liquid through conduit 28. The upper part of vessel 29 is connected by conduit 32 and conduit 12 to the evaporator coil 10, but this coil is segregated from the system by valves 20 and 21. Therefore, due to the pressure difference between vessel 29 and vessel 13, liquid flows from vessel 29 through conduit 31 upward into vessel 13.

Liquid rises in vessel 13 and carries float 17 upward until the float engages stop 18 and raises rod 16 to shift the toggle mechanism 15 to open valves 20 and 21. This equalizes the pressures in the system and liquid flows from vessel 13 into the evaporator coil 10. The pressures remain equalized so that liquid evaporates in coil 10 and condenses in coil 25 to transfer heat from the refrigerator compartment 11 to the refrigeration apparatus cooling element 22 while valves 20 and 21 are open. When the liquid level in control vessel 13 recedes due to evaporation of liquid in coil 10, the float 17 descends until it engages lower stop 19 and carries rod 16 downward to shift the toggle mechanism 15 to close valves 20 and 21. Thereupon, liquid continues to evaporate in coil 10 at increasingly higher pressures until the pressure which is exerted through conduit 12 and conduit 32 to vessel 29 is sufficient to force liquid from this vessel through conduit 31 upward into control vessel 13.

In the system shown in Fig. 2, the control vessel and reservoir are interchanged. Like parts in Figs. 1 and 2 are indicated by the same reference numerals. The lower end of evaporator coil 10 is connected by a conduit 33 to the lower part of a reservoir or circulation vessel 34. A check valve 35 in conduit 33 permits flow of liquid only toward evaporator 10. The upper end of evaporator coil 10 is connected by a conduit 36 to the upper part of a control vessel 37. The lower part of control vessel 37 is connected by a conduit 38 to the upper part of vessel 34. The upper part of vessel 34 is also connected by a conduit 39 to the upper end of coil 25. The lower end of coil 25 is connected by a conduit 40 to the lower part of control vessel 37. A check valve 41 permits only downward flow of liquid in conduit 40. The upper part of control vessel 37 is connected by a conduit 42 to conduit 39. In control vessel 37 is a spring toggle mechanism 43 operated by a rod 44 provided with upper and lower stops 45 and 46 respectively. A float 48 is loosely slideable on rod 44 between stops 45 and 46. A valve 49 is operated by toggle 43. Valve 49 controls communication of conduit 42 with control vessel 37. Upward movement of float 48 into engagement with stop 45 shifts the toggle mechanism 43 to close valve 49. Downward movement of float 48 into engagement with stop 46 shifts the toggle mechanism 43 to open valve 49.

When all parts of the apparatus are at room temperature liquid in the system will be contained in control vessel 37, and valve 49 will be closed. When the refrigeration apparatus is started to lower the temperature of cooling element 22 to cool coil 25, vapor condenses to liquid in coil 25. Collapse of vapor in coil 25 lowers the pressure in this coil and also in vessel 34 which is connected to the upper end of the coil by conduit 39. Control vessel 37, however, is segregated from coil 25 by valve 49, check valve 35, check valve 41, and liquid in the lower part of conduit 38. The pressure in coil 25 and vessel 34 decreases until the pressure difference between vessel 34 and control vessel 37 causes liquid to be forced from vessel 37 through conduit 38 upward into vessel 34. As liquid flows out of vessel 37, the float 48 descends and opens valve 49. This causes equalization of pressures in the system. The upper part of evaporator coil 10 is now connected through conduit 36, control vessel 37, conduit 42 and conduit 39 to coil 25. Liquid flows from vessel 34 through conduit 33 into coil 10. Liquid evaporates in coil 10 by heat transfer from the refrigerator compartment 11. The vapor flows to coil 25 and there condenses to liquid by heat transfer to the cooling element 22 of the refrigeration apparatus. The liquid flows downward from coil 25 through conduit 40 into vessel 37. As liquid rises in vessel 37, the float 48 moves upward until it snaps valve 49 closed. The evaporator 10 and control vessel 37 are again segregated from the condenser coil 25. Liquid continues to evaporate in coil 10 at increasingly greater pressures until there is reached a pressure which is communicated from the evaporator through conduit 36 to vessel 37 and forces liquid from this vessel through conduit 38 upward into vessel 34. As liquid recedes in vessel 37, the float 48 descends until valve 49 is opened to instigate another cycle.

What is claimed is:

1. A method of heat transfer which includes vaporizing fluid at an upper elevation, condensing vaporized fluid at a lower elevation, forming the condensate into a body of liquid, and raising condensate in a path of flow extending from said body of liquid below the surface level thereof upward to said upper elevation by intermittently trapping vapor from said upper elevation above said surface level of liquid to exert pulsating force of said vapor thereon.

2. A method of heat transfer which includes maintaining a body of liquid heat transfer fluid at an upper elevation, vaporizing fluid from said body, condensing vaporized fluid at a lower elevation, forming the condensate into a lower body of liquid, and raising condensate in a path of flow extending from said lower body of liquid below the surface level thereof upward to said upper body of liquid by intermittently trapping vapor from said upper elevation above said surface level of liquid in said lower body to exert pulsating force thereon responsive to rise and fall of the surface level of said upper body of liquid.

3. A method of heat transfer which includes maintaining a body of liquid heat transfer fluid at an upper elevation, vaporizing fluid from said body, condensing vaporized fluid at a lower elevation, forming the condensate into a lower body of liquid, and raising condensate in a path of flow extending from said lower body of liquid below the surface level thereof upward to said upper body of liquid by intermittently trapping vapor from said upper elevation above said surface level of liquid in said lower body to exert pulsating force of said vapor thereon responsive to rise and fall of the surface level of said lower body of liquid.

4. A heat transfer system including a circuit for heat transfer fluid having a place of vaporization at an upper elevation, a place of condensation at a lower elevation, and means for raising liquid between said elevations including a vessel for accumulating liquid, a conduit from the lower part of said vessel below the liquid surface level therein to said place of vaporization at said upper elevation, and means for alternately admitting condensate to said vessel from said place of condensation and trapping vapor from said place of vaporization above said surface level of liquid in said vessel to cause rise and fall of said liquid surface level and upward flow of liquid in said conduit upon the fall of said surface level.

5. A heat transfer system including a circuit for heat transfer fluid having a place of liquid accumulation and a place of vaporization at an upper elevation, a place of condensation and a second place of liquid accumulation at a lower elevation, a conduit from said lower place of liquid accumulation below the liquid surface level therein to said upper place of liquid accumulation, and means responsive to variation in surface level of liquid in said lower place of liquid accumulation for alternately admitting condensate to said lower place of liquid accumulation from said place of condensation and trapping vapor from said place of vaporization above said surface level of liquid to cause rise and fall thereof and upward flow of liquid in said conduit upon fall of said surface level.

6. A heat transfer system including a circuit for heat transfer fluid having a place of liquid accumulation and a place of vaporization at an upper elevation, a place of condensation and a second place of liquid accumulation at a lower elevation, a conduit from said lower place of liquid accumulation below the liquid surface level therein to said upper place of liquid accumulation, and means responsive to variation in surface level of liquid in said upper place of liquid accumulation for alternately admitting condensate to said lower place of liquid accumulation from said place of condensation and trapping vapor from said place of vaporization above said surface level of liquid to cause rise and fall thereof and upward flow of liquid in said conduit upon fall of said surface level.

7. A heat transfer system including an upper vessel, an evaporator connected to receive liquid from said upper vessel, a condenser situated below said vessel and said evaporator and connected to receive vapor from said evaporator, a lower vessel connected to receive condensate from said condenser and vapor from said evaporator, a conduit from the lower part of said lower vessel to said upper vessel, and means to intermittently segregate said condenser and said upper vessel with respect to other parts of the system to create a pressure difference between said vessels so that liquid is caused to rise from said lower vessel upward through said conduit to said upper vessel.

8. A heat transfer system as set forth in claim 7 in which said segregating means is operative responsive to variation in level of liquid in said upper vessel.

9. A heat transfer system as set forth in claim 7 in which said segregating means is operative responsive to variation in liquid level in said lower vessel.

ROBERT S. TAYLOR.